Patented Jan. 6, 1970

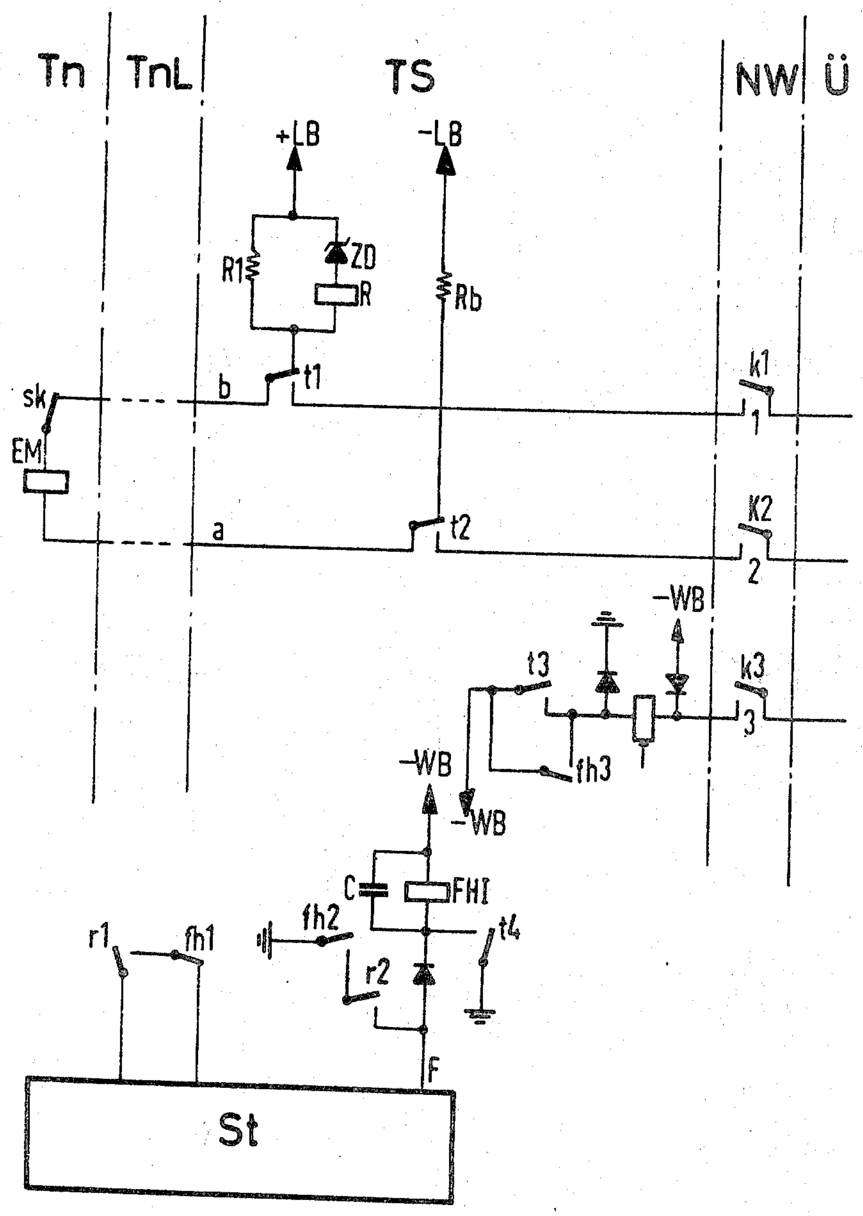
Tn
TnL
TS
NW
Ü
+LB
-LB
R1
ZD
R
Rb
t1
k1
sk
b
1
EM
a
t2
K2
2
-WB
t3
k3
3
fh3
T
-WB
-WB
C
FHI
r1
fh1
fh2
t4
r2
F
St United States Patent Office 3,488,441

3,488,441

SUBSCRIBER CIRCUIT SWITCHING SYSTEM FOR USE IN COMMUNICATION EXCHANGE INSTALLATIONS

Albert Peitz, Munich, Germany, assignor to Siemens Aktiengesellschaft, a corporation of Germany Filed Nov. 10, 1966, Ser. No. 593,355
Claims priority, application Germany, Nov. 17, 1965, S 100,524
Int. Cl. H04l *11/15*
U.S. Cl. 178—69.6 9 Claims

ABSTRACT OF THE DISCLOSURE

Control of a subscriber call relay in a communication system, such as a telegraph system through discrimination between a holding condition and a call condition. For this purpose a resistor shunts the relay to carry the holding current, and a threshold conduction device such as a Zener diode is connected in series with the call relay to allow it to operate only when calling current flows.

General Description

This invention relates to an improved subscriber circuit switching system for use in communication exchange installations such as telegraph and telephone exchange installations, and, more particularly, to a switching system of more compact size providing both evaluation of calls and interception of disturbances simulating calls.

In accordance with standard practice, in the holding condition, in which the subscriber is idle or not in use, the subscriber circuit is energized by a low level current termed the holding current. When a subscriber initiates a call, such as by actuating a call key, the subscriber circuit is in a calling condition and is energized by a calling current of a greater amplitude than the holding current.

The switching system of the invention distinguishes between the calling and holding condition to perform the call evaluation function. The switching system includes a switching means which preferably comprises a relay. The relay is connected with a Zener diode in a series circuit. A resistor is connected in parallel with the series circuit of the relay and Zener diode. The Zener diode establishes a threshold level of response of the relay for differentiating between holding and calling conditions of the subscriber circuit.

The blocking voltage of the Zener diode is selected to be larger than the voltage drop across the resistor produced by the flow of holding current in the holding condition, and to be smaller than the voltage drop across the resistor produced by the flow of calling current in the calling condition of the installation. Thus, during the holding condition, the relay is isolated from the holding current. Further, the switching means does not respond to disturbances occurring in the installation or in a given subscriber circuit which produce current flows which may exceed in amplitude that of the holding current, but which do not exceed the threshold level of response established for the calling current.

The switching system of the invention permits the use of smaller and less expensive switching relays than those required in switching circuits of prior art systems. The switching system of the invention provides the further advantage that the same switching means which supervises the subscriber circuit loop for call evaluation purposes also supervises the circuit loop for interception purposes, such as in the case of ground loop circuits which erroneously simulate calling conditions.

The switching system of the invention is readily adaptable for use with an exchange system having a central control system which processes the call connection and automatically couples the calling subscriber with the successive connection stages or links which are required for completing the call connection. The switching system of the invention, when employed with such a central control system, may be disconnected immediately upon coupling of a calling subscriber with the next successive stage or switching link of the connection path. Thus, the demands on the switching means and the length of time of participation of the switching means in a given call connection for evaluation and other purposes are substantially reduced.

Cross reference to related application

Applicant claims priority from corresponding German application Ser. No. S 100,524, filed Nov. 17, 1965.

State of the prior art

An objective of the technological advancements in long distance communication arts, and in particular in the telegraph and telephone exchange arts, is to permit the use of smaller components having higher operation speeds and greater reliability than components used in previous systems. An example of such an advancement in exchange systems comprises the use of switching matrices rather than dial selectors for completing connection paths. Central control systems control the establishment of call connections through the switching matrices, and contribute to increased speed in the establishment of connections and in the overall economy and efficiency of the exchange installation. Modern exchange systems of this type permit the use of components having the desired characteristics of greater operation speeds and smaller size than the components required in older exchange systems, such as those employing dial selectors.

The modernization of exchange installations presents new problems, however, since many of the components employed in the prior art systems can no longer be utilized. For example, such components may not satisfy construction requirements in the sense of their being excessively large and bulky and not having the requisite operating speeds. Frequently, however, the smaller, more modern components cannot satisfy the response conditions, or electrical operating characteristics required in a practical exchange installation. The replacement of the conventional calling relay employed in current-day exchange installations by a smaller and less expensive relay presents such a problem.

A calling relay is required to differentiate or distinguish between holding and calling conditions of the exchange installation. As noted previously, the holding condition under ideal circumstances is characterized by the flow of a low amplitude level holding current. There also may occur leakage or stray currents which, due to unfavorable but unavoidable conditions, may flow between the transmission lines or between a given transmission line and ground. Thus, the operating capability of the calling relay to perform such differentiation is of great importance. Prior art calling relays have had to accommodate the greatest possible difference of current levels in the subscriber loop to successfully differentiate between the holding and calling conditions.

Conventional exchange systems also employ a component known as an interception relay for intercepting ground or loop circuit signals which erroneously indicate a calling condition. The prior art interception relay similarly must satisfy certain critical conditions with regard to its operating characteristics.

Therefore, both calling and interception relays of prior art systems must satisfy exacting operating requirements to provide accurate response to calling conditions, despite the occurrence of disturbances such as those caused by leakage currents, and must effect release or drop-out only under the appropriate conditions—i.e., disturbances occurring during a call connection which would simulate an end-of-call condition or which occur following a call connection and simulate a new subsequent calling condition must not cause an erroneous response. Frequently, more modern components, although smaller, less expensive, and generally satisfying more closely the desired construction characteristics for use with modernized exchange systems, do not possess the required operational characteristics to satisfy these stringent requirements in accordance with the typical operating conditions of exchanges.

Objects of the invention

These and other defects of, and problems presented by, the prior art are overcome by the switching system of the invention.

It is therefore an object of the invention to provide a subscriber circuit switching system incorporating smaller components than heretofore possible in the prior art.

Another object of this invention is to provide a subscriber circuit switching system for use in long distance exchange installations which satisfies the requirements of accurately responding to the operating conditions of the installation while permitting the use of switching elements which are smaller and less expensive than those capable of being used in prior art switching systems.

Still another object of this invention is to provide a subscriber circuit switching system which performs both call evaluation and interception functions.

A further object of this invention is to provide a subscriber circuit switching system which is adaptable for use with an exchange installation having a central control system.

Another object of this invention is to provide an improved subscriber circuit switching system for an exchange installation contributing to greater economy and efficiency of the exchange installation.

These and other objects of the invention will be more fully understood in the following detailed description of the invention.

Detailed description of the invention

The single figure of drawing shows, in schematic form, those portions of an exchange installation incorporating the switching system of the invention which are essential to an understanding of the invention.

The switching system of the invention is shown in an embodiment comprising a local subscriber circuit connected with a telegraph exchange installation having a central control system. However, it will be understood that the switching system of the invention is adaptable to various other systems, and, in particular, to telephone exchange installations. A subscriber T*n* is represented in the drawing by a receiving magnet EM and an emitter contact *sk*. The subscriber T*n* is connected over subscriber lines T*n*L, represented diagramatically by dotted lines in the drawing, with a subscriber circuit TS. The subscriber circuit TS is connectable over a network NW to a repeater Ü. The details of the repeater Ü are not essential to an understanding of the invention and therefore are not represented in the drawing. A through connection, or completed call connection, is effected from the subscriber T*n* and through the subscriber lines T*n*L and circuit TS over coupling contacts *k*1, *k*2, and *k*3 associated with the conductors 1, 2, and 3, respectively, of the network NW to the repeater Ü.

A central system S*t* effects the closing of the contacts *k*1, k2, and *k*3 in a manner not indicated but well understood to those skilled in the art. Typically, a coupling relay (not shown) may be energized in accordance with the dial information received from the subscriber for actuating its associated contacts, such as *k*1, *k*2, and *k*3, for connecting the subscriber circuit with the appropriate next stage or link of the call connection, such as the repeater Ü.

In accordance with the invention, the subscriber circuit TS comprises a relay R which may be of any suitable type, for example an ESK-relay, which is connected in series with a Zener diode ZD to a positive power supply terminal +LB. A resistor R1 is connected in parallel with the series connection of the relay R and the Zener diode ZD. The subscriber circuit TS further comprises a relay represented in the drawing by the winding FHI and associated contacts *fh*1, *fh*2, and *fh*3. The relay R includes the associated contacts *r*1 and *r*2. The relay contacts are all shown in their normal or holding position and are movable to the opposite position, when actuated by energization of the associated relay, in accordance with conventional practice.

In the holding condition, an operation holding current flows through the subscriber loop in a circuit including the following circuit elements:

(1) +LB, R1, *t*1, *b*, *sk*, EM, *a*, *t*2, R*b*, —LB

The value of the resistor R1 is selected with regard to the amplitude of the holding current such that the voltage drop occurring across its terminals due to the flow of holding current therein is smaller than the blocking voltage of the Zener diode ZD. As a result, no current flows through the series circuit of the Zener diode ZD and the relay R, and the latter is not energized. Thus, the relay R does not respond to the holding current and the holding condition on the subscriber loop.

The calling condition is initiated by the actuation of a call key (not shown) by the subscriber T*n*. The actuation of the call key, in a well-known manner, causes the current to increase in the subscriber loop. The call key actuation typically comprises changing the internal impedance of the elements at the subscriber station whereby an increased current is permitted to flow through the subscriber loop and between the power supply terminals +LB and —LB. There is thus established the flow of a "calling current" in the circuit (1).

The amplitude of the calling current is sufficiently larger than that of the holding current to establish a voltage drop across the resistor R1 which exceeds the blocking voltage of the Zener diode ZD. As a result, the Zener diode ZD commences conduction and the winding of the relay R is energized.

As noted previously, the switching system of the invention is adaptable for use with an exchange incorporating a central control system and is shown in this manner in the drawing. The central system S*t* has associated therewith a signalling circuit including the normally open contacts *r*1 and the normally closed contacts *fh*1. Energization of the relay R actuates its contact *r*1, thereby completing a circuit through the normally closed contacts *fh*1, and enabling the signalling circuit to present an indication to the central control system S*t* that a connection establishment is desired by the subscriber T*n*.

The central control system S*t* responds to the request by completing an appropriate coupling connection of the subscriber loop to the next stage or connection link of the exchange required for completing the call connection. In completing the coupling connection, central control system S*t* selects a free one of a plurality of such successive connection stages which typically are provided in a practical exchange. In the example of the drawing, the repeater Ü comprises such a free, next connection link in accordance with the call connection demanded by the subscriber Tn. The completion of the connection of the subscriber loop of subscriber T*n* to the repeater Ü is effected by the actuation of contacts *k*1 and *k*2, as noted previously. Actuation of contact *k*3 completes a circuit from the repeater Ü to the winding of relay T and through the diode associated therewith to ground.

Energization of the winding of relay T actuates its associated contacts *t*1, *t*2, *t*3, and *t*4. Actuation of contacts *t*1 and *t*2 opens the energizing circuit of the subscriber circuit TS, expressed above as circuit (1), whereby relay R is no longer energized and drops out. As a result of the drop-out of relay R, its associated contact *r*1 returns to its normal position, as indicated. The signalling circuit is thereby disabled and the indication of a call connection demand from the subscriber T*n* to the central system S*t* is terminated. Actuation of contact *t*3 provides a "busy" indication to any codes received by the installation and demanding a connection to the subscriber T*n*. Actuation of contact *t*4 energizes winding FHI of a relay FH, for a purpose to be described hereafter, in accordance with the following circuit:

(2) ground, *t*4, FHI, —WB

The subscriber loop is now separated from the power supply of the subscriber circuit TS and, instead, receives energizing current from the next successive coupling stage, namely, the repeater Ü. Calling current now flows through the subscriber loop in accordance with the following circuit:

(3) +LB', *k*1, *t*1, *b*, *sk*, EM, *a*, *t*2, *k*2 to —LB'

The notations +LB' and —LB' indicate that the power supply terminals are included in the repeater Ü.

Upon the establishment of the calling current flow in the subscriber loop as expressed in circuit (2), a dial request is transmitted to the subscriber T*n*. This dial request typically is transmitted by the repeater Ü in a manner which is well known and therefore not explained in detail herein. The subscriber T*n* thereupon commences the emission of the appropriate dial information corresponding to the demanded call connection. As soon as the called subscribed is reached, i.e., a connection is completed to the called subscriber station, the repeater Ü receives a "connected" signal.

In accordance with completion of the connection, the subscriber loop is supplied for the writing condition by the repeater Ü in accordance with the following circuit:

(4) +LB', *k*2, *t*2, *a*, EM, *sk*, *b*, *t*1, *k*1, —LB'

The notations +LB' and —LB' indicate that the power supply terminals are included in the circuit of the re-repeater Ü.

The release or termination of an existing connection takes place in a well-known manner through the process of evaluating an end of call signal in the connection stage connected to the subscriber circuit TS. In the drawing, this connection stage is the repeater Ü. In response to the end of call signal, the holding circuit of the coupling relay which previously effected and maintained closure of the contacts *k*1 to *k*3 is opened, so that the circuits through the coupling conductors 1, 2 and 3 of the network NW are opened. Relay T of the subscriber circuit TS is no longer energized and drops out, its associated contacts *t*1 to *t*4 returning to the normal or holding positions indicated in the drawing. As a result, relay R of the switching system is again connected to the subscribed lines *a* and *b* of the subscriber circuit TS as indicated in the drawing and in accordance with circuit (1).

The circuit of the subscriber T*n* reverts to a high ohmic value, typically due to a switching operation commonly known as re-poling.

The re-poling, or switching of the subscriber loop to a higher ohmic value presents the possibility that, due to the line capacity, re-charging current impulses may occur in the subscriber loop for a short period of time. Since the subscriber loop has returned to the holding condition, these current impulses may be of sufficient amplitude to produce a voltage drop across resistor R which exceeds the blocking voltage of the Zener diode ZD and as a result effects energization of the relay R. Should this occur, the relay R would be energized and would actuate its contact *r*1, enabling the signaling circuit to erroneously indicate a call connection demand to the central control system S*t*.

To avoid the erroneous enabling of the signalling circuit, the relay FH is provided with delayed drop-out characteristics. This delay drop-out characteristic may conveniently be provided by the capacitor C connected in shunt across the relay winding FHI. The delayed drop-out characteristic of the relay FH provides that its associated contact *fh*1 remains in its actuated position for a short interval of time subsequently to the termination of the call connection and the re-poling effect at the subscriber circuit. Thus, the signalling circuit will not be enabled even though the contact *r*1 may be actuated due to the inadvertent energization of relay R during this delay time interval. The delay time interval is sufficient to insure that the re-charge current impulses have attenuated sufficiently so that the Zener diode ZD returns to its blocking condition and prevents energization of the relay R during the normal holding condition.

The drop-out delay of the relay FH, in asosciation with its contact *fh*2 enables the relay R to serve a second function of intercepting simulated calls caused by unavoidable disturbances in the subscriber loop, such as those caused by ground or loop circuits. The relay R which serves as the switching means of the switching system of the invention therefore performs a dual function, both responding to calls as a calling relay and intercepting simulated calls. A simulated call resulting from ground or loop circuit currents produces the same effect at the switching system of the subscriber circuit TS as does the actuation of a call key in a telegraph system or the lifting of a telephone receiver in a telephone system at the subscriber location. This effect, as explained previously, is to energize the relay R due to the increase in current. In accordance with the embodiment of the invention, as shown in the drawing and as applied to the telegraph art, the energization of relay R produces a call indication to the central control system S*t* by actuation of the contact *r*1. Further, as in the case of an ordinary call, a connection link of the next following stage, for example the repeater Ü, is connected to the subscriber circuit TS over the coupling contacts of the network NW.

If no subsequent dialing of an information code follows the connection of the subscriber T*n* to the repeater Ü in the manner previously described, a busy signal is sent back from the repeater Ü to the subscriber circuit TS over the subscriber lines. An appropriate system for supervising the dial signals and transmitting the busy signal in the manner indicated is not shown in the drawing but is well understood in the art and therefore is not described in detail herein. Alternative forms of supervising systems may also be employed to respond to this condition.

As noted previously, relay FH is energized due to the closure of contact *t*4 in the circuit (2). After the emission of the busy signal from the repeater Ü connected to the subscriber circuit TS in which the simulated call occurred, the connection between the subscriber circuit TS and the repeater Ü is released. Relay T therefore is no longer energized and drops out. Its associated contacts *t*1 and *t*2 return to their normal, holding condition and connect relay R to the subscriber lines *a* and *b*.

Due to the ground or loop circuit, however, the subscriber loop is still in a low-ohmic condition, enabling a large current to flow and simulating a calling condition. Relay R therefore again responds to this simulated calling condition. However, the delay drop-out of relay FH causes its associated contact *fh*1 to remain actuated at this time. Thus, energization of relay R and the resultant actuation of its contact *r*1 does not produce a starting call indication at the central system S*t*.

The duration of the loop or ground current may exceed the delay drop-out time of the relay FH. A holding circuit is therefore provided for the relay FH to prevent further interference by the simulated calling condition presented by the loop or ground circuits. Relay R further includes a contact *r*2 and relay FH further includes an associated contact *fh*2. Each of the contacts *r*2 and *fh*2 therefore is actuated during the occurrence of a loop or ground circuit, completing a holding circuit for relay winding FHI as follows:

(5) ground, *fh*2, *r*2, FHI, —WB

The winding FHI of relay FH therefore remains energized for the duration of the loop or ground circuit and maintains actuation of its contact *fh*1 for this same period of time, whereby the signalling circuit is disabled and no further call indication is made to the central system in response to a simulated call condition. When the disturbance in the subscriber loop which simulated the call condition has terminated, the current in the subscriber loop reverts to its low value of the normal holding condition. The Zener diode ZD then reverts to its blocking condition and prevents energization of relay R. Contact *r*2 thereupon returns to its normal position, opening the holding circuit for the winding FHI of relay FH. Following its normal drop-out delay period, relay FH is de-energized and its contact *fh*1 returns to its normal or holding position. After a certain drop-out period, therefore, relay R is again available as a switching means for call evaluation.

The disturbance on the subscriber line can be indicated to the central system S*t* over an input terminal F and from this point to a supervision system which may be contained within the central system S*t* or which may be provided separately therefrom. Contact *fh*3 of the relay FH, when actuated due to energization of relay F*h* during the simulated call condition, provides a "busy" indication for the subscriber circuit TS. The exchange will therefore produce a busy indication to any request for a call connection to the subscriber T*n* from a calling subscriber. The contact *fh*3 therefore performs the same busy signal indication function as does the contact *t*3 which is closed in the case of a normal call connection condition for the subscriber T*n*.

In summary, it will be appreciated that the switching system of the invention may readily be adapted to various systems other than the telegraph exchange system indicated. Particularly, the switching system finds ready application in telephone exchange systems. The switching system of the invention permits the use of a switching element such as an ESP relay which is compact in size and may provide extremely rapid switching action. Even though such a relay may not satisfy the electrical characteristics of a calling relay in an exchange system, the switching system of the invention provides for the requisite characteristics. Further, the switching system of the invention enables the same switching element to perform the functions of both a calling relay and an interception relay. The reduced cost and smaller size of the relay switching element permitted by the switching system of the invention, and the dual function of the switching system of the invention contributes to a substantial increase in the efficiency and decrease in the cost of an exchange installation, while also providing improved operating characteristics.

It will be evident that many changes could be made in the systems of the invention without departure from the scope thereof. Accordingly, the invention is not to be considered limited to the particular embodiments disclosed herein, but only by the scope of the appended claims.

What is claimed is:

1. A switching system for a subscriber circuit (TS) associated with a communication exchange installation comprising:
- first switching means (R) for evaluating calls by a subscriber (T*n*),
- unidirectional conducting means (ZD) having a predetermined conduction threshold and connected with said first switching means (R) in a series circuit,
- impedance means (R1) connected in a parallel circuit with said series circuit, and
- means for establishing in said impedance means (R1) a flow of holding current during a holding condition, and a flow of calling current during a calling condition of said subscriber circuit (TS), the holding current producing a voltage drop across said impedance means (R1) which is less than the conduction threshold of said unidirectional conducting means (ZD) and the calling current producing a voltage drop across said impedance means (R1) which exceeds the conduction threshold of said unidirectional conducting means (ZD) whereby said first switching means (R) is energized by the calling current for responding to the calling condition.

2. A switching system as recited in claim 1 wherein said first switching means (R) comprises a relay.

3. A switching system as recited in claim 1 wherein said unidirectional conducting means (ZD) comprises a Zener diode and said impedance means (R1) comprises a resistive element.

4. A switching system as recited in claim 1 wherein there is further provided:
- a central system (S*t*) associated with said subscriber circuit (TS),
- a first actuating means (*r*1) associated with said first switching means (R) and actuated thereby in response to energization of said first switching means by a calling current, and
- a signalling circuit including said first actuating means (*r*1) of said first switching means (R) and responsive to actuation of said first actuating means (*r*1) for indicating a calling condition to said central system (S*t*).

5. A switching system as recited in claim 4 wherein:
- said first switching means is subject to erroneous energization by current impulses occurring in the subscriber circuit upon termination of a call connection, and wherein there is further provided:
- a second switching means (FH) including a first actuating means (*fh*1) connected in said signalling circuit with said first actuating means (*r*1) of said first switching means (R),
- said second switching means (FH) being energized in response to the establishment of a call connection of said subscriber circuit (TS) for actuating said first actuating means (*fh*1) thereof to disable said signalling circuit for terminating the calling condition indication to said central system (S*t*), and
- said second switching means (FH) including means (C) providing a drop-out delay thereof for maintaining said signalling circuit disabled for the time period of the drop-out delay subsequently to termination of the call connection to prevent erroneous call condition indications to the central system (S*t*).

6. A switching system as recited in claim 4 wherein there is further provided:
- a second switching means (FH) including a first actuating means (*fh*1) connected in said signalling circuit with said first actuating means (*r*1) of said first switching means (R),
- each of said first (R) and second (FH) switching means further includes a second actuating means (*r*2, *fh*2, respectively) connected to provide a holding circuit for said second switching means (FH),
- said first switching means (R) responding to a simulated calling condition resulting from a disturbance in the subscriber circuit and actuating said first actuating means (*r*1) thereof in said signalling circuit to indicate a calling condition to said central system (St) and actuating said second actuating means (r2) in said holding circuit, said central system (St) effecting energization of said second switching means (FH) in response to the calling condition indication, said second switching (FH) means actuating first actuating means (fh1) thereof in said signalling circuit to terminate said calling condition indication and actuating said second actuating means (fh2) thereof to complete said holding circuit for maintaining energization of said second switching means (FH), and said holding circuit maintaining the energization of said second switching means (FH) until termination of the disturbance creating the simulated calling condition.

7. A switching system as recited in claim 6 wherein there is further provided an error indication output terminal (F) connected to said holding circuit, actuation of said second actuating means (r2, fh2) in said holding circuit of each of first (R) and second (FH) switching means upon the occurrence of disturbances in the subscriber circuit (TS) simulating a calling condition producing an error indication at said error output terminal (F).

8. A switching system as recited in claim 6 wherein said second switching means (FH) further includes a third actuating means (fh3) associated therewith, said third actuating means (fh3) being actuated in response to energization of said second switching means to produce a busy indication for the associated subscriber circuit (TS) during the occurrence of a simulated calling condition.

9. A switching system as recited in claim 4 wherein there is further provided:

a subscriber circuit loop (a, b, TnL) for connecting said subscriber circuit (TS) to a subscriber (Tn), a third switching means (T) including actuating means (t1, t2) normally connecting said parallel circuit to said subscriber circuit loop (a, b, TnL), said central system (St) establishing a coupling connection to said subscriber circuit loop (a, b, TnL) in response to a call connection indication by said signalling circuit, and said third switching means (T) being energized upon completion of said coupling connection to actuate said actuating means (t1, t2) thereof for disconnecting said parallel circuit from said subscriber circuit loop (a, b, TnL).

References Cited

UNITED STATES PATENTS

| | | | |
|---|---|---|---|
| 2,088,750 | 8/1937 | Kinkead | 178—69.6 |
| 2,652,446 | 9/1953 | Oberman | 178—2 |
| 2,983,780 | 5/1961 | Heil | 178—2 |

OTHER REFERENCES

Silicon Zener Diode and Rectifier Handbook, 2nd edition, copyright 1961, pp. 114–115, Motorola, Inc.

THOMAS A. ROBINSON, Primary Examiner
MARSHALL M. CURTIS, Assistant Examiner

U.S. Cl. X.R.

178—2